C. L. HEMENWAY & F. W. UPDEGRAFF.
MOTOR VEHICLE.
APPLICATION FILED MAY 24, 1910.
1,018,052. Patented Feb. 20, 1912.
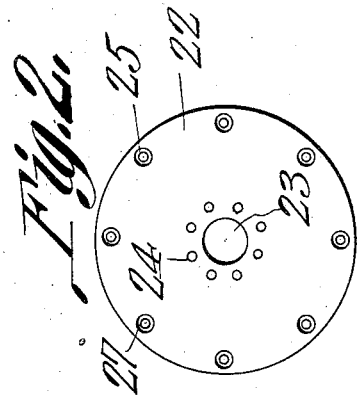
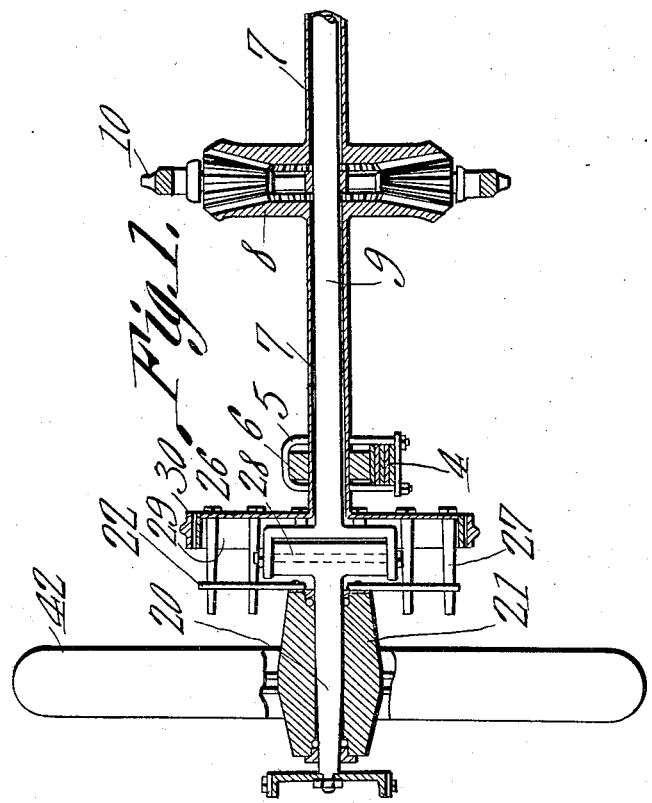
Charles L. Hemenway AND
Frank W. Updegraff, Inventors
by C. A. Snow & Co.
Attorneys
Witnesses

UNITED STATES PATENT OFFICE.

CHARLES LIMON HEMENWAY AND FRANK WILLIAM UPDEGRAFF, OF COVELO, CALIFORNIA.

MOTOR-VEHICLE.

1,018,052.　　　　　Specification of Letters Patent.　　Patented Feb. 20, 1912.

Application filed May 24, 1910.　Serial No. 563,230.

*To all whom it may concern:*

Be it known that we, CHARLES LIMON HEMENWAY and FRANK WILLIAM UPDEGRAFF, citizens of the United States, residing at Covelo, in the county of Mendocino, State of California, have invented a new and useful Motor-Vehicle, of which the following is a specification.

It is the object of this invention to provide novel means for operatively connecting the traction wheels of the vehicle with the driving mechanism thereof.

Another object of the invention is to improve the braking mechanism and to improve the driving mechanism.

The drawings show typical embodiments merely, and it is to be understood that changes, properly falling within the scope of what is claimed, may be made without departing from the spirit of the invention.

In the drawings,—Figure 1 is a horizontal section of a portion of one of the axles and its attendant mechanism, parts being shown in elevation; and Fig. 2 is an elevation of the head which is connected with the wheel, the fingers whereby the head is operatively connected with the driving mechanism, being likewise shown in end elevation.

In order that the drawings may not be encumbered by immaterial details, the body of the vehicle and all common elements connected therewith, have been omitted.

The springs 4 are assembled by means of clevises 5, or in any other suitable manner, with bearings 6.

The construction of the front and rear axles of the vehicle is substantially identical. The description will be applied to one axle, it being understood that, saving in so far as specifically modified, this description will apply with equal propriety to the other axle.

Journaled for rotation in the bearings 6, are axially alined tubular members 7, rotatable upon a fixed axle 9, the adjacent ends of the tubular members 7 being connected with the differential 8. Connected with the extremities of the axle 9, are movable axle ends 20 upon which the hubs 21 of the wheels 42 are mounted, the wheels being supported upon ball bearings, or like anti-friction means. Secured to the inner end of the hub 21, is a head 22, seen most clearly in Fig. 2. This head 22 is in the form of a flat circular plate, having a central opening 23 for the reception of the movable axle end 20. Positioned about the opening 23, are other openings 24, adapted to receive bolts or the like, whereby the head 23 may be connected with the hub 21 of the wheel. Located in the head 22, adjacent the periphery thereof, are a plurality of openings 25. Fashioned integrally with the tubular member 7 or connected therewith fixedly, in any other desired manner, is a head 26. This head 26 is disposed substantially parallel to the head 22, and from the head 26 project, toward the side of the vehicle, a plurality of tapered fingers 27. These fingers 27 are adapted to register in the openings 25 in the head 22. It is to be noted, referring specifically to Fig. 2, that the openings 25 in the head 22, are of considerably greater diameter than the diameter of the fingers 27 which register in the said openings. By this construction, when the head 26 is rotated, the fingers 27, engaging the head 22 in the openings 25 therein, will serve to insure a simultaneous rotation of the wheel 42 and the tubular member 7. However, owing to the difference in diameter between the openings 25 and the fingers 27, the movable axle end 20 may be tilted with respect to the axle 9, through a considerable arc, without causing the fingers 27 to bind in the openings in the head 22 in which they are mounted. The movable axle end 20 is connected with the axle proper by means of a knuckle 28, the same being located between the heads 22 and 26. The head 26 carries at its periphery, an outstanding flange 29, adapted to receive the brake strap 30. The coöperation between the heads 22 and 26, secured by the fingers 27, permits an operative connection between the wheel 42 and the tubular member 7, without interfering seriously with the tilting movement of the movable axle end 20.

Having thus described the invention, what is claimed is:—

In a device of the class described, an axle; a tubular member mounted for rotation upon the axle; a movable axle end; a wheel upon the axle end; a plate upon the inner end of the hub of the wheel, the plate being provided with openings; a plate upon the tubular member, provided with a peripheral flange; a brake engaging the flange;

fingers upon the last named plate, the fingers being located between the tubular member and the flange, entering, removably, the openings in the first named plate; connections between the axle and the movable axle end, located between the plates; and means for rotating the tubular member.

In testimony that we claim the foregoing as our own, we have hereto affixed our signatures in the presence of two witnesses.

CHARLES LIMON HEMENWAY.
FRANK WILLIAM UPDEGRAFF.

Witnesses:
JOHN GILMAN,
H. J. NASH.

Copies of this patent may be obtained for five cents each, by addressing the "Commissioner of Patents, Washington, D. C."